Figure 1:
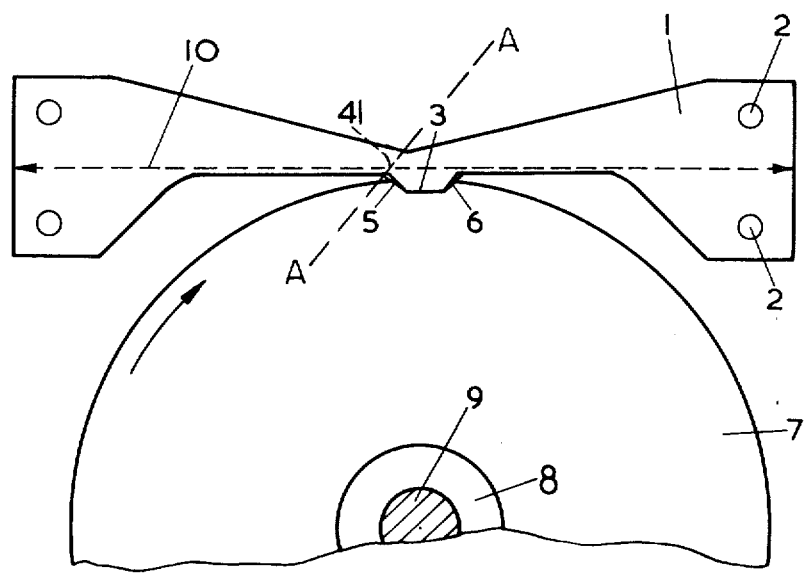

United States Patent [19]

Highfield et al.

[11] 3,901,759
[45] Aug. 26, 1975

[54] PLASTICS WEB SLITTING AND SEALING DEVICE

[75] Inventors: Peter Edward Highfield; Gordon John Hill, both of Stevenage, England

[73] Assignee: British Visqueen Limited, London, England

[22] Filed: June 18, 1974

[21] Appl. No.: 480,577

Related U.S. Application Data

[63] Continuation of Ser. No. 287,697, Sept. 11, 1972, abandoned, which is a continuation of Ser. No. 65,584, Aug. 20, 1970, abandoned.

[30] Foreign Application Priority Data

Sept. 8, 1969 United Kingdom............... 44341/69

[52] U.S. Cl. .................................................. 156/515
[51] Int. Cl.² ............................................. B32B 31/00
[58] Field of Search .......... 156/515, 259, 260, 250, 156/1; 30/140; 83/171

[56] References Cited
UNITED STATES PATENTS

| | | | |
|---|---|---|---|
| 2,535,029 | 12/1950 | Atanasoff et al. ................... | 156/515 |
| 3,263,540 | 8/1966 | Lefevre et al.......................... | 83/171 |
| 3,368,930 | 2/1968 | Beason................................ | 156/515 |
| 3,741,850 | 6/1973 | Highfield et al. .................... | 156/515 |

Primary Examiner—Douglas J. Drummond
Attorney, Agent, or Firm—Cushman, Darby & Cushman

[57] ABSTRACT

In a resistance heating blade for simultaneously slitting and edge sealing a plastics web, the flat blade having a projection which, in operation, projects edgeways through the path of the web and serves to cut and seal together the film layers, the blade is shaped so that its smallest cross-section is located in advance of the apex of the projection, so that heat is concentrated at or about the point at which the blade first contacts the web.

1 Claim, 2 Drawing Figures

PLASTICS WEB SLITTING AND SEALING DEVICE

This is a continuation of application Ser. No. 287,697 filed Sept. 11, 1972, which is a continuation of Ser. No. 65,584 filed Aug. 20, 1970, both now abandoned.

This invention relates to a device for slitting and heat sealing plastics webs.

In simultaneously slitting and edge sealing plastics webs comprising two or more layers, generally of plastics films, it is known to pass the web round a rotating roller and to slit and heat seal the web longitudinally by means of a flat blade having a heated substantially V-shaped edge, or projection of its edge, which projects into a circumferential slot on the roller with the arms of the V in a plane at right angles and perpendicular to the axis of the roller. The device may also be used for slitting single layer webs of plastics materials, for example to prevent fraying of the cut edges of woven fabrics, or to form edge beads to strengthen the cut edges of slit films. The flat blade of this known device is made of a material of high resistivity, such as a high resistance alloy, is heated by passing a low voltage electric current through it, and is shaped so that it reaches its smallest cross-section at the apex of the V; the heat is thus concentrated at this point. For the heat sealing and slitting process, the apex of the blade is generally heated to a temperature sufficiently high for the film to be melted and to shrink away from the blade at its first contact with the blade, or even before it actually comes into contact with the blade. In this known device, however, the V-shaped part of the blade is equally heated along each arm from the apex, and the heat generated beyond the apex in the direction of travel of the film is largely wasted.

We have now found that such a method may be more economically operated if the blade is constructed so that it reaches its least cross-sectional area at a point in advance of the apex of the V-shaped portion of the blade.

In accordance with the present invention, therefore, a heat sealing device for simultaneously slitting a continuously advancing plastics web and sealing the slit edges, and comprising a resistance heating element in the form of a substantially flat blade provided with a projecting edge portion so shaped that it may, with its leading edge, intersect the path of the advancing web when the blade is held perpendicular thereto and with its flat faces parallel with the direction of travel of the web, is characterized in that the blade reaches its smallest cross-sectional area in advance of the apex of the projection, in relation to the travelling web, preferably substantially at a point at which the projection may intersect the path of the web.

The exact location of the part of smallest cross-sectional area of the blade in relation to the advancing web is preferably at a position at which it will provide maximum heat to the advancing web. This will depend to some extent on the geometry of the system, particularly on the slope of the projecting edge portion, but will generally be at, or a little in advance of, the point of intersection of the blade with the path of the web.

Figure 2:
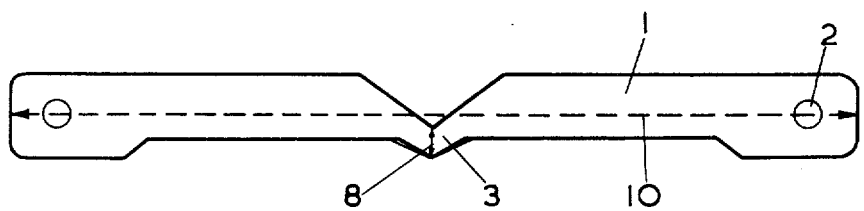

One preferred form of the device of the invention will now be described with reference to the accompanying drawings of which:

FIG. 1 is a side view, partly in section, of the device in operation, working opposite a slotted, rotating roller for carrying the plastics film web; and FIG. 2 is a side view of a known type of heat sealer blade for use in the same operation.

In FIG. 1: 1 is the flat blade, apertured, as at 2, for attachment to a pair of conductors of low resistivity, through which electric current may be supplied. The blade is provided with a projection, 3, and has its smallest cross-sectional area at 4. Section line A—A passing through the blade 1 at its smallest cross-sectional area 4 intersects the leading edge 5 of said projection 3 at a point 4'. The leading edge, 5, of the projection 3, and the trailing edge, 6, are bevelled as shown. 7 is a unit of a roller for carrying the plastics film web past the blade, the projection 3 of the blade fitting into a slot between this unit of the roller and the next, so that the edge 5 of the projection 3 first intersects the path of a web advancing with the roller; the point 4', as shown in FIG. 1, is substantially level with the surface of the roller 7 when the blade 1 is so positioned. It is this arrangement that contributes to the energy savings that result with the use of applicants' invention since the maximum heat is generated in the blade at 4 and 4'. The roller units are separated by a spacer 8, and are carried on a shaft 9.

In FIG. 2, the part of the blade of smallest cross-sectional area is indicated at 8, other reference numerals being as in FIG. 1.

It will be seen that, whereas with the blade of FIG. 2 the apex, 3, of the blade heats up equally on both sides, the blade of FIG. 1 has its hottest part in advance of the apex, close to the advancing web, and slightly in advance of the point at which the edge 7 intersects the path of the web. The device of FIG. 1 thus uses the heat generated in the blade far more efficiently than that of FIG. 2.

In a particular example of a high resistance heater blade as shown in FIG. 1, the blade is made from a strip of 80/20 nickel/chrome alloy, 0.07 inch (0.49 mm) thick, 6 inches (14.7 cm) long and 1½ inches (3.68 cm) wide. The shortest width, at 4, is 0.218 inch (5.34 mm), compared with a shortest width of 0.281 inch (6.88 mm) at the corresponding position at the other side of the projection 3.

To provide improved uniformity of the bead seals at the slit edges the overall shape of the blade is preferably as described in copending application Ser. No. 65,582 filed Aug. 20, 1970, now U.S. Pat. No. 3,741,850. Thus, the contour of the blade and the positions of its attachment in the device are preferably such that the neutral line of tension lies wholly within the body of the blade. By the term "neutral line of tension" is meant the line through the ends of the blade about which the strains resulting from the attachment of the blade at its two ends, under longitudinal tension, are balanced. Such a construction, which is illustrated by the blade shown in FIG. 1 of the drawings accompanying this specification (the neutral line of tension being indicated at 10 in both Figures) is found to give a more uniform heat seal along the cut edges of the web, compared with heat seals formed by blades hitherto used in slit-sealing methods of the type described, in which the neutral line of tension crosses the cut-away part of the blade behind the projection, as shown in FIG. 2 of these drawings.

The device of the present invention may be used for any of the slit-sealing operations mentioned hereinbefore. It is particularly useful for slitting webs comprising two layers of plastics films and simultaneously sealing together the pairs of adjacent cut edges. This method is used, for example, for dividing flattened tubular films into two or more sections, and for plastics bag manufacture.

We claim:

1. An apparatus for slitting and heat-sealing a plastics film and comprising in combination a rotatable roll having a peripheral groove and a resistance heating blade of substantially flat, elongated form parallel with said roll groove, said blade being provided on one of its longer edges with a projection having a leading edge, said blade being cut away behind said projection so as to have its smallest cross-sectional area in the vicinity of said projection, and so that a line passing through said blade and sectioning said blade at said smallest cross-sectional area intersects said leading edge of said projection at a certain point, and wherein said blade is positioned so that said projection enters said groove and so that said certain point is substantially level with the surface of said roll.

* * * * *